United States Patent
Dao

(10) Patent No.: US 6,427,213 B1
(45) Date of Patent: Jul. 30, 2002

(54) APPARATUS, METHOD AND SYSTEM FOR FILE SYNCHRONIZATION FOR A FAULT TOLERATE NETWORK

(75) Inventor: Thomas Kiet Dao, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/193,084

(22) Filed: Nov. 16, 1998

(51) Int. Cl.[7] .................. H02H 3/05; H03K 19/003
(52) U.S. Cl. .................. 714/12; 714/11; 714/13
(58) Field of Search ................ 714/12, 2, 4, 6, 714/11, 13

(56) References Cited

U.S. PATENT DOCUMENTS

| | | | | |
|---|---|---|---|---|
| 4,455,601 A | * | 6/1984 | Griscom et al. | 364/200 |
| 4,797,884 A | * | 1/1989 | Yalowitz et al. | 714/13 |
| 5,251,299 A | * | 10/1993 | Masuda et al. | 395/200 |
| 5,278,969 A | * | 1/1994 | Pashan et al. | 395/425 |
| 5,303,243 A | * | 4/1994 | Anezaki | 371/9.1 |
| 5,621,884 A | * | 4/1997 | Beshears et al. | 395/182.08 |
| 5,784,551 A | * | 7/1998 | De Leva et al. | 395/182.11 |
| 5,907,673 A | * | 5/1999 | Hirayama et al. | 395/182.14 |
| 5,914,919 A | * | 6/1999 | Fosler et al. | 369/34 |
| 6,141,769 A | * | 10/2000 | Petivan et al. | 714/10 |
| 6,148,410 A | * | 11/2000 | Baskey et al. | 714/4 |

* cited by examiner

Primary Examiner—Peter Wong
Assistant Examiner—Tim Vo
(74) Attorney, Agent, or Firm—Nancy R. Gamburd

(57) ABSTRACT

An apparatus, method and system are provided for file synchronization for a fault tolerant network, and are both application and platform independent. The fault tolerant network generally includes an active network entity, such as a telecommunication server, and a standby network entity to assume the functionality of the active network entity in the event of a failure of the active network entity. The method of the present invention includes accessing a file within the active network entity, such as through a read or write request of any network application. A file access request within the active network entity is generated and transmitted to the standby network entity, which also performs the file access request. The standby network entity then generates and transmits a file access confirmation to the active network entity. The active network entity then determines whether the file access request of the active network entity has a corresponding file access confirmation from the standby network entity. When the file access request has the corresponding file access confirmation, indicating that the files are in synchrony between the active and standby network entities, the active network entity then deletes the file access request and the corresponding file access confirmation from memory; but when the file access request does not have the corresponding file access confirmation, indicating a lack of synchrony, the active network entity then generates an error message and transfers the file access request to an error log, for subsequent use.

19 Claims, 3 Drawing Sheets

APPARATUS, METHOD AND SYSTEM FOR FILE SYNCHRONIZATION FOR A FAULT TOLERATE NETWORK

FIELD OF THE INVENTION

The present invention relates in general to computer and telecommunication networks and, more particularly, to file synchronization for fault tolerant telecommunication networks.

BACKGROUND OF THE INVENTION

With the advent of increasingly sophisticated telecommunication services, telecommunication networks are increasingly distributed. For example, rather than having telecommunication services performed by a centralized computer having multiple processors, these telecommunication services are increasingly performed by a distributed network of computers and servers, in which each such computer or server generally contains a single or central processor, such as an Intel Pentium class processor. The advantages of such a distributed network of computers and servers, typically connected to each other via a high speed bus, an ethernet or fiber optic cable, include cost effectiveness and the capability for incremental network growth.

A particular difficulty with such distributed, networked computers concerns fault tolerance, such that if one computer becomes disabled, another computer on the network may immediately take over all the functions previously performed by the disabled computer, with minimal disruption of service. For example, if the primary computer providing telecommunication services (referred to as the active application processor ("active AP") (also known as a distinguished application processor)) should become disabled (crash), to avoid an interruption of service, a fault tolerant system may provide for a secondary computer (referred to as a standby application processor ("standby AP")), to immediately assume the performance of all services previously provided by the active AP. In order for the standby AP to immediately come on line with minimal disruption of service, as if no fault or other major event occurred, the standby AP preferably should have access to identical information and be in synchrony with the active AP.

In the prior art, attempts to maintain such synchrony have typically involved copying files by the standby AP from the active AP. Such a copying process is typically very time consuming, involving minutes for copying of gigabit sized files, necessitating an intervening loss or disruption of service. As a consequence, a need remains to reduce any such delay or interruption dramatically, to avoid service interruptions lasting longer than a few seconds.

Other prior art systems, while providing synchrony, typically do not allow such computers to operate autonomously, but only in locked step. Other fault tolerant systems do not provide for a standby mechanism, but merely provide a disk array (raid) for automatic backing up of information stored to a disk. Other systems require additional hardware for redundant clustering computers, and are platform dependent.

As a consequence, a need remains for an apparatus, method and system to provide information synchrony in a fault tolerant network. Such synchrony should occur within a very small time frame, such as seconds, to avoid service interruptions. In addition, such an apparatus, method and system should not require any additional hardware, should be platform independent, and should be application independent, with such fault tolerance occurring transparently to the user and to the application.

SUMMARY OF THE INVENTION

In accordance with the present invention, an apparatus, method and system are provided for file synchronization for a fault tolerant network, in which the fault tolerant network generally includes an active network entity, such as a telecommunication server, and a standby network entity to assume the functionality of the active network entity in the event of a failure of the active network entity. The apparatus, method and system of the present invention provide such information synchrony within a very small time frame, such as seconds, to avoid service interruptions in the event that the active network entity fails and the standby network entity becomes active. In addition, the apparatus, method and system of the present invention do not require any additional hardware, are platform and application independent, with such fault tolerance occurring transparently to the user and to the application.

The method of the present invention begins with accessing a file within the active network entity, such as through a read or write request of any network application. A file access request within the active network entity is generated and transmitted to the standby network entity, which also performs the file access request. The standby network entity then generates and transmits a file access confirmation to the active network entity. The active network entity then determines whether the file access request of the active network entity has a corresponding file access confirmation from the standby network entity. When the file access request has the corresponding file access confirmation, indicating that the files are in synchrony between the active and standby network entities, the active network entity then deletes the file access request and the corresponding file access confirmation from memory. When the file access request does not have the corresponding file access confirmation, however, indicating a lack of synchrony, the active network entity then generates an error message and transfers the file access request to an error log, for subsequent use. Such subsequent use may include generating an alarm condition and transferring the standby network entity to an active status.

As indicated above, this methodology is transparent to and independent of the network application. The methodology is also independent of an operating platform within the active and standby network entities. The various file access requests typically include a read request, a write request, an open request, and a close request, and may be invoked through any type of network application.

Numerous other advantages and features of the present invention will become readily apparent from the following detailed description of the invention and the embodiments thereof, from the claims and from the accompanying drawings.

DETAILED DESCRIPTION OF THE INVENTION

Figure 1:
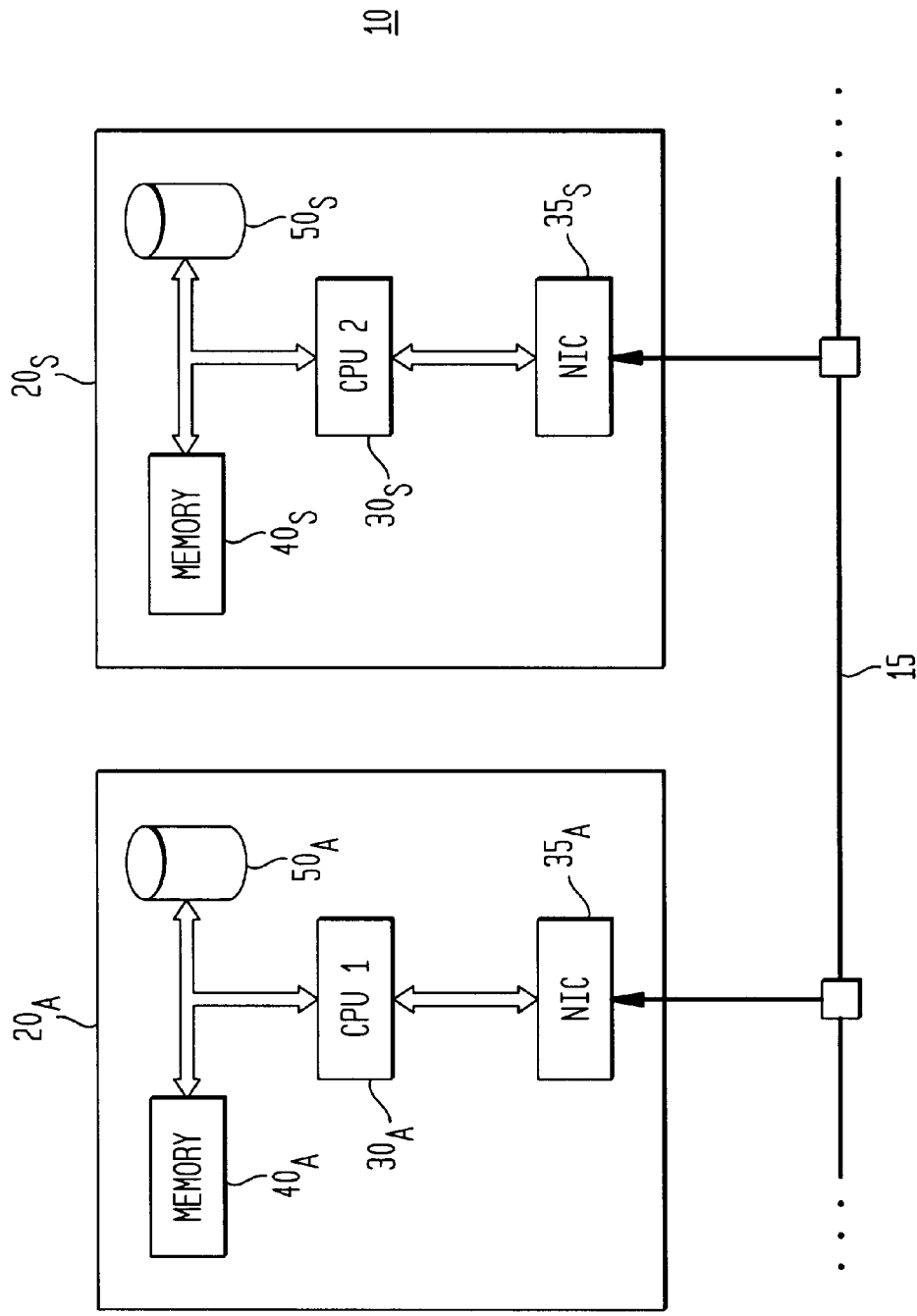
FIG. 1 is a block diagram illustrating an apparatus and system embodiment of the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for an apparatus, method and system to provide information synchrony in a fault tolerant network. In accordance with the present invention, an apparatus, method and system provide such information or file synchrony in a fault tolerant network within a very small time frame, such as seconds, to avoid service interruptions. In addition, the apparatus, method and system of the present invention do not require any additional hardware, are platform independent, are application independent, and provide such fault tolerance transparently to the user and to the application.

FIG. 1 is a block diagram illustrating apparatus 20 and system 10 embodiments of the present invention. Each apparatus 20 may be considered a network entity, such as service control point, a service node, or another type of telecommunication server, with the system 10 including a plurality of such apparatuses 20 coupled via a communication link 15, such as an ethernet or any other link of any communication medium (such as T1/E1, fiber optic cable, coaxial cable, etc.). Referring to FIG. 1, each apparatus 20 (designated as $20_A$ and $20_S$) includes a processor (CPU) 30, a network interface (NIC) 35, a first memory 40 (such as RAM), and a second, longer term memory 50 (such as a magnetic hard drive, optical storage device, or any other type of data storage device). Each apparatus 20, at any given time, may have an operating state referred to as active ($20_A$) or standby ($20_S$), and in the preferred embodiment, each apparatus $20_A$ and $20_S$ is a corresponding active AP or standby AP.

The apparatuses $20_A$ and $20_S$ are connected to each other (and potentially to other apparatuses 20) via a communication link 15, such as an ethernet or other network transmission medium, for communication with each other via each of their corresponding network interfaces 35, to form a system 10 in accordance with the present invention. Within or coupled to each apparatus 20, the second, longer term memory 50, such as a magnetic hard drive, is utilized for data or other file storage. In accordance with the present invention, data or other file access (as discussed in greater detail below) is synchronized between the active AP (such as apparatus $20_A$) and the standby AP (such as apparatus $20_S$). Within each apparatus 20, the first memory 40 is used, in the preferred embodiment, to store program instructions as discussed below. The processor 30 has bi-directional access to the second memory 50, such as for opening, reading from, writing to, and closing files stored in the second memory 50.

Continuing to refer to FIG. 1, each processor (CPU) 30 may include a single integrated circuit (IC), or may include a plurality of integrated circuits or other components, connected, arranged or grouped together, such as microprocessors, digital signal processors (DSPs), application specific integrated circuits (ASICs), associated memory (such as RAM and ROM), and other ICs and components. As a consequence, as used herein, the term processor should be understood to equivalently mean and include a single processor, or arrangement of processors, microprocessors, controllers or some other grouping of integrated circuits which perform the functions discussed above and also discussed in detail below with reference to FIGS. 2 and 3, with associated memory, such as microprocessor memory or additional RAM, ROM, EPROM or E²PROM. The methodology of the invention, as discussed below with reference to FIGS. 2 and 3, may be programmed and stored, in the processor 30 with its associated memory (such as first memory 40) and other equivalent components, as a set of program instructions for subsequent execution when the processor 30 is operative (i.e., powered on and functioning).

As discussed in greater detail below, whenever an application within an active AP, such as apparatus $20_A$, accesses a file within the second memory $50_A$, that file access is duplicated, in real time, within the standby AP (apparatus $20_S$) and its corresponding second memory $50_S$. Utilizing "FSYNC" processes within each processor $30_A$ and $30_S$, whenever a file access occurs in the active apparatus $20_A$, a corresponding file access request is transmitted by the active processor $30_A$ (via the network interface $35_A$, communication link 15 and network interface $35_S$) to the standby processor $30_S$. The standby processor $30_S$ then processes the file access request, and returns a confirmation (also via the communication link 15 and the corresponding network interfaces 35) to the active processor $30_A$. The active processor $30_A$, through the FSYNC processes, monitors that every file access request (within the active AP) has a corresponding confirmation from the standby AP. As a consequence, the methodology of the present invention insures that the standby AP has virtually immediate access to all current information stored within the active AP.

Figure 2:
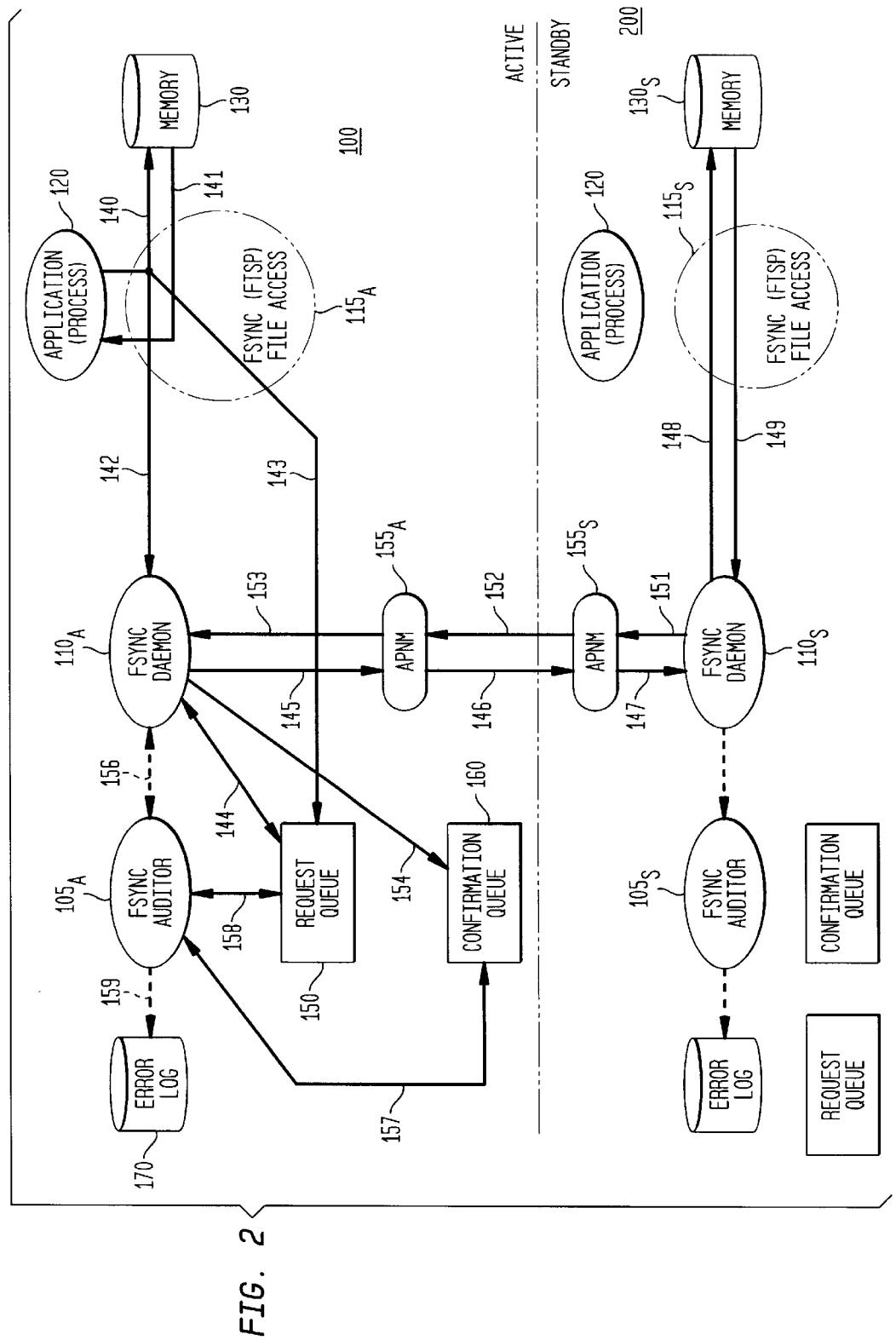
FIG. 2 is an operational flow diagram illustrating the processes occurring within an active AP and a standby AP in accordance with the present invention.

FIG. 2 is an overall, operational flow diagram illustrating a methodology of the present invention, as exemplified by the processes occurring in an active AP 100 and a standby AP 200 in accordance with the present invention. As illustrated in FIG. 2, there are a collection of file synchronization processes referred to as "FSYNC", which pertain to the synchronization of selected files (stored in second memory 50) from the active AP 100 to the standby AP 200. As illustrated in FIG. 2, these file synchronization (FSYNC) processes are the FSYNC auditor 105, the FSYNC daemon 110, and the FSYNC file access process 115 (also referred to as FSYNC (ftsp) file access, wherein "ftsp" refers to fault tolerant system processes). These FSYNC processes are identical in the active AP 100 and the standby AP 200, and are differentiated with subscripts, such that the subscript "A" designates the active processes occurring within the active AP 100, while the subscript "B" designates the standby processes occurring within the standby AP, at any given time. It should be noted that at any particular time, a given apparatus 20 (such as a AP or other computer) may transition from an active status to an inactive or out-of-service AP, or from an active to a standby AP, or from a standby to an active AP. As a consequence, each process may be contained within both active and standby APs, although different processes may be functioning at any given time.

Continuing to refer to FIG. 2, the file synchronization methodology of the present invention occurs when any application (or process) 120 accesses information, data or other files (individually and collectively referred to herein as "files") located in memory 130, such as the second memory 50 illustrated in FIG. 1. Such a memory 130, for example, may be a magnetic hard drive, a magnetic tape drive, or an optical storage medium. As illustrated in FIG. 2, such access of the memory 130 by the application (or process) 120 is illustrated as access 140, which may be a request to open a file, to read from a file, to write to a file, or to close a file, with such a file stored in the memory 130. Any type of application 120 may be involved, and the file synchronization methodology of the present invention is completely transparent to and independent of any given application 120 and any given platform of the apparatus 20 (AP).

In the preferred embodiment, whenever such an application 120 occurs which involves access to memory 130, a library of functions are called or invoked, referred to as the FSYNC file access functions 115. As a consequence, when a file is accessed (140) by an application (or process) 120, the target file is accessed via a FSYNC file access function, and the result of the file access (141) is returned to the application (or process) 120.

As the application (or process) 120 requests access to a file in memory 130, it instantiates a new object of the class or library FSYNC 115, such as FSYNC_Disk_IO ( ). As the constructor FSYNC_Disk_IO( ) is executed, the FSYNC daemon 110 receives a signal or interrupt (142), and the request for file access is also registered (143) in a request queue 150. The FSYNC daemon 110, now interrupted, examines (144) the request queue 150, and sends (145) the request for file access (that was in the request queue 150) to the application processor node manager (or management) (APNM) 155, which is store and forward software to transmit information to other computers or servers on a network or other system (via the network interfaces 35 and the communication link 15). The APNM 155$_A$ then transmits the file access request (146) to the standby AP 200, which in turn is received by the APNM 155$_S$ of the standby AP.

The APNM 155$_S$ of the standby AP 200 then transfers (147) this remote request for file access to the FSYNC daemon 110$_S$ operating within the processor 30$_S$ on the standby AP 200. The FSYNC daemon 110$_S$ then performs (148) the request for file access, such as opening or writing to a particular file stored in memory 130$_S$ (such as second memory 50$_S$) and receives (149) a return value, such as num_bytes_written. The FSYNC daemon 110$_S$ then transfers this return result as a confirmation (151) to the APNM 155$_S$, which in turn transmits (152) the confirmation to the active AP 100 (also via the network interfaces 35 and the communication link 15). The APNM 155$_A$ of the active AP 100 then transfers (153) the confirmation to the FSYNC daemon 110$_A$ which registers (154) the received confirmation in the confirmation queue 160.

The FSYNC Auditor 105$_A$ regularly monitors the operational status of the FSYNC daemon 110$_A$, which regularly transmits (156) an announcement or "heartbeat" to the FSYNC Auditor 105$_A$. The FSYNC Auditor 105$_A$ also regularly or periodically monitors the file synchronization process. The FSYNC Auditor 105$_A$ reads (157) the confirmation queue 160 and reads (158) the request queue 150. The FSYNC Auditor 105$_A$ then compares every confirmation with a corresponding request, and if they are both valid, they may be deleted from their respective queues 150 and 160. In the event a matching confirmation from the standby AP 200 cannot be matched to a corresponding request in the request queue 150, the FSYNC Auditor 105$_A$ transfers (159) the request from the request queue into the error log 170 for a later audit or alarm condition.

As illustrated in FIG. 2, the various processes of the present invention provide that every file access in the active AP is matched by a file access in the standby AP, thereby insuring that the standby AP has up-to-date information at all times. In addition, in the event that the active AP is not transmitting such requests to the standby AP, such that no confirmations are then received by the active AP, any missing information in the standby AP may be recovered from the error log 170.

Figure 3:
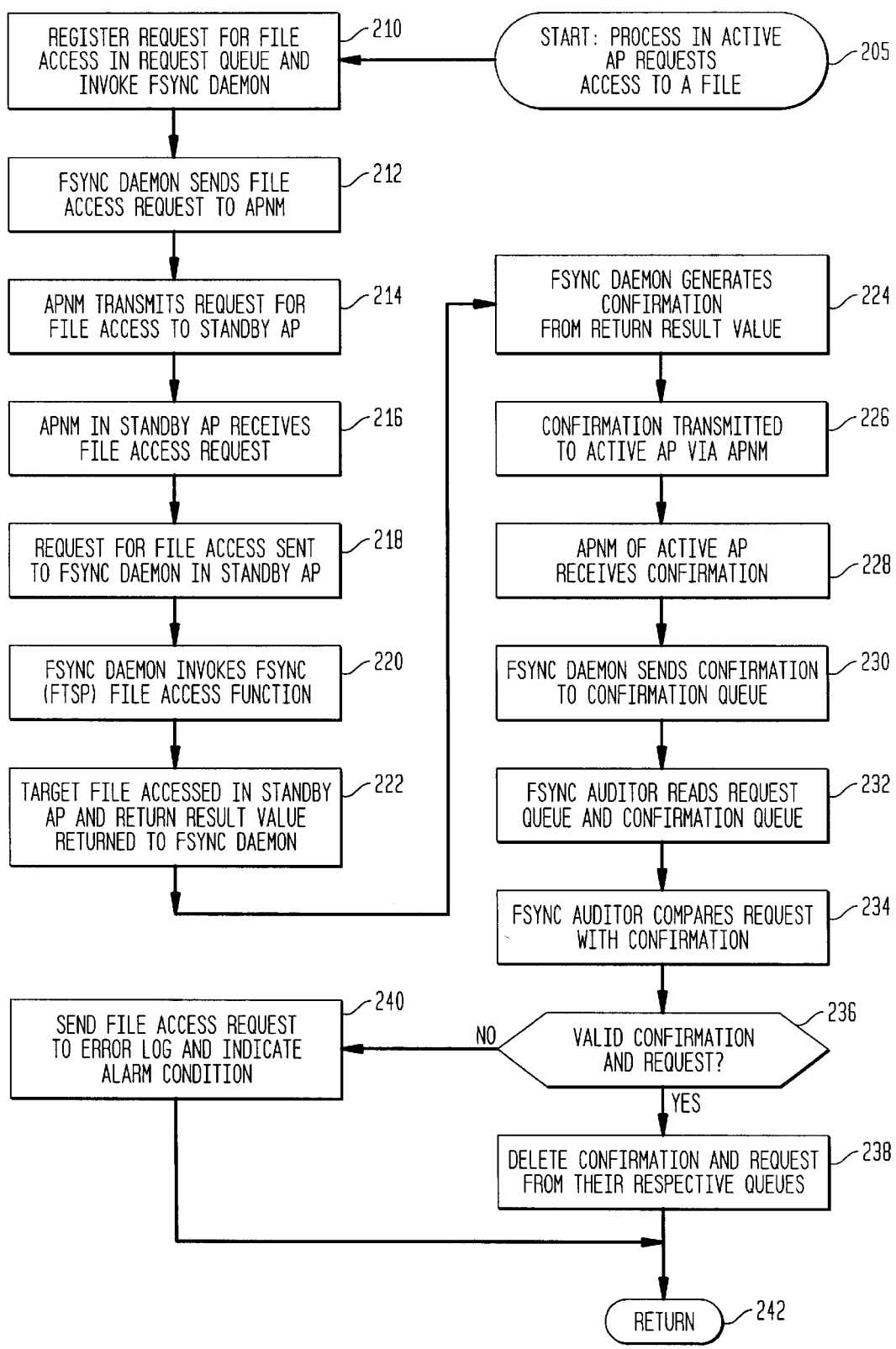
FIG. 3 is a flow diagram illustrating a method in accordance with the present invention.

FIG. 3 is a flow diagram illustrating the method in accordance with the present invention. The method begins, start step 205, with a process in the active AP requesting access to a file. The request for file access is then registered in the request queue, and the FSYNC daemon process in invoked, such as through an interrupt signal, step 210. Next, in step 212, the FSYNC daemon sends the file access request to APNM, and the APNM transmits the request for file access to the standby AP, step 214. The APNM in the standby AP receives the file access request, step 216, and sends the request for file access to the FSYNC daemon in the standby AP, step 218.

Continuing to refer to FIG. 3, the FSYNC daemon in the standby AP invokes the FSYNC ftsp file access function, step 220. The target file is accessed, and a return result value is returned to the FSYNC daemon in the standby AP, step 222. The FSYNC daemon then generates a confirmation from the return result value, step 224, and transmits the confirmation to the active AP via the APNM of the standby AP, step 226. The APNM of the active AP then receives the confirmation, step 228, and transfers the confirmation to the FSYNC daemon. The FSYNC daemon sends the confirmation to the confirmation queue, step 230. Periodically, the FSYNC Auditor reads the request queue and the confirmation queue, step 232, and compares each confirmation with each request, step 234. When there is a valid confirmation for each request, step 236, the corresponding confirmation and request may be deleted from their respective queues, step 238, and this portion of the method may end, return step 242. When in step 236 a valid confirmation cannot be paired with a corresponding request, the file access request is transmitted to the error log, step 240, followed by a possible alarm condition, and the method may also end, return step 242.

In accordance with the present invention for file synchronization, an exemplary program in the C++ language is illustrated below, for utilizing C++ derived classes in a manner that is transparent to and independent of any particular application or process within the active and standby APs. Using the Object-Oriented Programming capabilities of the C++ language, new C++ classes are derived with inheritance from the original base classes. The new classes will contain methods for synchronization in accordance with the present invention. For example, an ftsp class which originally contains iofstream will now be derived to fsync_iofstream. The latter will guarantee that a file write is replicated both in the active and standby APs. An AP daemon may be utilized to insure which AP is active, standby, or out-of-service, at any given time.

The following example shows how a new derived class syn_Disk_IO is derived from the ftsp class Disk_IO.

```
/*
*       @(#) Disk_IO.H 2.1.1.2/sunsable/nsps/sdb/nsps/2nsps
            /util/Shared/src/s.Disk_IO.H
*       Disk_IO.H    2.1.1.2    20 Nov 1996 16:47:09
*/      #ident "@(#) Disk_IO.H 2.1.1.2/sunsable/nsps/sdb/nsps
            /2nsps/util/Shared/src/s.Disk_IO.H"
/*
```

-continued

```
*    NAME:  Disk_IO
*    WHAT:
*           This is the class that support disk reads, writes, and
*           seeks. The constructor will open the specified file,
*           and the destructor will close the file. In the case
*           where a file size is specified, these routines will
*           manage the file size to not exceed the specified number
*           of blocks.
*/
class Disk_IO
{
public:
            Disk_IO( );
            DISK_IO(char *file_name);
            Disk_IO(char *file_name, int max_size, int block_size =
DEV_BSIZE);
            ~Disk_IO( );
            int dread(char *file_name, int);
            int dwrite(char file_name, int);
            int seek(long);
public:
            static Trace_tool NS_UTIL_DISKIO;     // Trace object for
                                                   debugging
            int      io_error;                    // upon encountering
                                                   errors, errno is
                                                   stored here
            Boolean  bad_obj;                     // Keeps track of object
                                                   being usable/not
            int      first_block;                 // First data block of the
                                                   file
            int      fp;                          // UNIX file descriptor
                                                   value
            int      highest_write;               // Highest written
                                                   location so far
            int      bsize;                       // # bytes in each block
            int      current_read;                // Block to be read
                                                   next
            int      current_write;               // Block to be written
                                                   next
            char     fname[DISK_MAX_NAME];        // Name of the file
};
            The new derived Class with synchronization:
class fsync_Disk_IO( ) : public Disk_IO
{
public:
            fsync_Disk_IO( )                      // FSYNC constructor
            fsync_Disk_IO(char *file_name) ;// FSYNC constructor
            fsync_Disk_IO(char *file_name, int max_size, int
            block_size=DEV_BSIZE);                // FSYNC constructor
            // This constructor will cause all file accesses to
            wait for completion of FSYNC
            fsync_Disk_IO(char *file_name, int max_size, int
            Block_size=DEV_BSIZE, bool wait_for_fsync);
            -Disk_IO( ) ;                         // new FSYNC destructor
            //new member functions with FSYNC
            int dwrite(char *Queue, int num_bytes);
            int dread(char *Queue, int num_bytes);
            int seek(long offset);
}
```

As illustrated above, in accordance with the present invention, every file access in an active AP is effectively duplicated, in real time, in a standby AP. As a consequence, in the event that the standby AP is required to assume the functionality of the active AP and transition to an active mode, the standby AP already has immediate access to virtually all current information utilized by the (formerly) active AP. As a further consequence, in the event of such transitions in a fault tolerant network, service interruption is minimized.

Numerous other advantages of the present invention may be apparent. The apparatus, method and system of the present invention provide information synchrony in a fault tolerant network, and provide such information or file synchrony in a fault tolerant network within a very small time frame, such as seconds, to avoid service interruptions. In addition, the apparatus, method and system of the present invention do not require any additional hardware, are platform independent, are application independent, and provide such fault tolerance transparently to the user and to the application.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

I claim:

1. A method for file synchronization for a fault tolerant network, the fault tolerant network including an active network entity and a standby network entity, the method comprising:
    (a) accessing a file within the active network entity;
    (b) generating a file access request within the active network entity and transmitting the file access request to the standby network entity, the file access request selected from a plurality of file access requests, the plurality of file access requests including a read request, a write request, an open request, and a close request;
    (c) performing the file access request by the standby network entity;
    (d) generating a file access confirmation by the standby network entity and transmitting the file access confirmation to the active network entity;
    (e) determining whether the file access request of the active network entity has a corresponding file access confirmation of the standby network entity; and
    (f) when the file access request of the active network entity has the corresponding file access confirmation of the standby network entity, deleting the file access request and the corresponding file access confirmation; and
    (g) when the file access request of the active network entity does not have the corresponding file access confirmation of the standby network entity, generating an error message and transferring the file access request to an error log of the active network entity.

2. The method of claim 1, wherein step (b) further comprises:
    transferring the file access request to a request queue in the active network entity.

3. The method of claim 1, wherein step (d) further comprises:
    transferring the file access confirmation to a confirmation queue in the active network entity.

4. The method of claim 1, wherein step (c) further comprises:
    generating a return result value.

5. The method of claim 1, wherein step (a) is performed by a network application of a plurality of network applications.

6. The method of claim 1, wherein the performance of steps (b) through (g), inclusive, are independent of an operating platform within the active and standby network entities.

7. The method of claim 5, wherein the performance of steps (b) through (g), inclusive, is transparent to the network application.

8. The method of claim 5, wherein the performance of steps (b) through (g), inclusive, is independent of the network application.

9. A system for file synchronization for fault tolerance, the system comprising:
    a standby network entity, the standby network entity including program instructions to perform a file access request, and to generate and transmit a file access confirmation; and
    an active network entity coupled to the standby network entity through a communication link, the active network entity including instructions to generate the file access request when a network application accesses a file, the file access request selected from a plurality of file access requests, the plurality of file access requests including a read request, a write request, an open request, and a close request; and to transmit the file access request to the standby network entity; the active network entity including further instructions to receive the file access confirmation from the standby network entity and to determine whether the file access request has a corresponding file access confirmation received from the standby network entity; and when the file access request has the corresponding file access confirmation received from the standby network entity, the active network entity including further instructions to delete the file access request and the corresponding file access confirmation; and the active network entity including further instructions, when the file access request does not have the corresponding file access confirmation received from the standby network entity, to generate an error message and to transfer the file access request to an error log of the active network entity.

10. The system of claim 9, wherein the standby network entity generates a return result value upon performance of the file access request.

11. The system of claim 9, wherein the file synchronization is transparent to the network application.

12. The system of claim 9, wherein the file synchronization is independent of the network application.

13. The system of claim 9, wherein the file synchronization is independent of an operating platform within the active network entity and the standby network entity.

14. An apparatus for file synchronization for a fault tolerant network, the apparatus having an active state and a standby state, the apparatus comprising:
    a network interface for transmission and reception of a file access request and for transmission and reception of a file access confirmation;
    a memory to store the file access request and the file access confirmation; and
    a processor coupled to the network interface and to the memory, wherein the processor, when operative, includes program instructions, in the apparatus active state, to generate the file access request when a file is accessed by a network application, the file access request selected from a plurality of file access requests, the plurality of file access requests including a read request, a write request, an open request, and a close request; wherein the processor includes further instructions, when in the apparatus active state, to transmit the file access request via the network interface, to determine whether the file access request has a corresponding file access confirmation; wherein the processor includes further instructions, when in the apparatus active state, when the file access request has the corresponding file access confirmation, to delete the file access request and the corresponding file access confirmation from the memory, and when the file access request does not have the corresponding file access confirmation, to generate an error message and to transfer the file access request to an error log within the memory; and wherein the processor includes further instructions, when in the apparatus standby state, to perform the file access request, to generate the file access confirmation, and to transmit the file access confirmation via the network interface.

15. The apparatus of claim 14, wherein the processor includes further instructions to generate a return result value upon performance of the file access request.

16. The apparatus of claim 14, wherein the memory includes a request queue for storing the file access request and further includes a confirmation queue for storing the file access confirmation.

17. The apparatus of claim 14, wherein the file synchronization is transparent to the network application.

18. The apparatus of claim 14, wherein the file synchronization is independent of the network application.

19. The apparatus of claim 14, wherein the file synchronization is independent of an operating platform.

* * * * *